United States Patent
Yamamoto et al.

(10) Patent No.: US 11,186,512 B2
(45) Date of Patent: Nov. 30, 2021

(54) MOLD MANUFACTURING METHOD

(71) Applicant: NALUX CO., LTD., Osaka (JP)

(72) Inventors: Kazuya Yamamoto, Osaka (JP);
Tatsuya Murayama, Osaka (JP);
Yukinobu Nishio, Osaka (JP); Kayoko Fujimura, Osaka (JP)

(73) Assignee: NALUX CO., LTD., Osaka (JP)

( * ) Notice: Subject to any disclaimer, the term of this patent is extended or adjusted under 35 U.S.C. 154(b) by 5 days.

(21) Appl. No.: 16/752,082

(22) Filed: Jan. 24, 2020

(65) Prior Publication Data

US 2020/0156983 A1 May 21, 2020

Related U.S. Application Data

(63) Continuation of application No. PCT/JP2018/029069, filed on Aug. 2, 2018.

(60) Provisional application No. 62/544,185, filed on Aug. 11, 2017.

(51) Int. Cl.
*C03B 11/08* (2006.01)

(52) U.S. Cl.
CPC .......... *C03B 11/082* (2013.01); *C03B 11/086* (2013.01); *C03B 2215/11* (2013.01); *C03B 2215/412* (2013.01)

(58) Field of Classification Search
CPC . C03B 11/082; C03B 11/086; C03B 2215/11; C03B 2215/412
See application file for complete search history.

(56) References Cited

U.S. PATENT DOCUMENTS

| | | | | |
|---|---|---|---|---|
| 4,842,633 | A * | 6/1989 | Kuribayashi | B22F 5/007 216/24 |
| 5,049,177 | A * | 9/1991 | Nakata | C03B 11/082 65/93 |
| 5,436,764 | A * | 7/1995 | Umetani | B29C 43/021 264/1.21 |
| 6,432,328 | B2 * | 8/2002 | Hamanaka | C03B 11/08 264/1.36 |
| 6,989,932 | B2 * | 1/2006 | Cho | B29C 43/021 264/1.38 |

(Continued)

FOREIGN PATENT DOCUMENTS

| | | |
|---|---|---|
| EP | 1 679 532 A1 | 7/2006 |
| JP | 11-142609 A | 5/1999 |
| JP | 2005-132679 A | 5/2005 |

(Continued)

OTHER PUBLICATIONS

International Search Report and Written Opinion dated Oct. 9, 2018 corresponding to International Patent Application No. PCT/JP2018/029069, and partial English translation thereof.

*Primary Examiner* — Omar Flores Sanchez
(74) *Attorney, Agent, or Firm* — Squire Patton Boggs (US) LLP

(57) ABSTRACT

Provided is a mold manufacturing method that is capable of manufacturing a mold of a complex shape particularly of an optical element with sufficient shape accuracy and within a relatively short time. This mold manufacturing method includes: a step for forming a base made of metal into a first shape through machining; a step for coating the base with a resin layer; a step for forming the resin layer into a second shape; and a step for forming the base into a third shape through dry-etching.

7 Claims, 10 Drawing Sheets

(56) References Cited

U.S. PATENT DOCUMENTS

2005/0093210 A1    5/2005  Umetani et al.

FOREIGN PATENT DOCUMENTS

JP      2006-188416 A     7/2006
WO   WO 2010/087208 A1   8/2010

* cited by examiner

MOLD MANUFACTURING METHOD

TECHNICAL FIELD

The present invention relates to a mold manufacturing method, particularly to a manufacturing method for a mold for an optical element.

BACKGROUND ART

By way of example, conventional manufacturing methods for a mold for a microlens array will be described below. A time require to manufacture a mold for a microlens array by machining (JP1999142609A, for example) is substantially proportional to the number of the microlenses. For example, the number of the microlenses of a microlense array used for an intermediate screen and having a size of a business card, in the array the microlenses being arranged at intervals of 100 micrometers, is approximately 500,000. Manufacturing a mold for such a microlens array by machining is not practicable from the standpoint of a time required for the manufacturing. Apart from a time required for manufacturing, when a mold is manufactured through machining, a possible change in the shape of the mold due to wear of a tool is also disadvantageous. On the other hand, when a mold for a microlens array is manufactured through the lithography technology, difficulty in forming a three-dimensional shape with a high accuracy and generation of a roundness of edges forming lines surrounding a microlens, that is, edges forming sides of the microlens in a process of laser drawing of a resist are disadvantageous.

Thus, a manufacturing method for a mold in a complicated shape, such as a mold for a microlens array having a large number of microlenses, by which the mold can be manufactured in a relatively small time and with a sufficient shape accuracy has not been developed.

PRIOR ART DOCUMENT

Patent Document

Patent document 1: JP1999142609A

Accordingly, there is a need for a manufacturing method for a mold in a complicated shape, particularly a mold for an optical element, by which the mold can be manufactured in a relatively small time and with a sufficient shape accuracy. The object of the present invention is to provide a manufacturing method for a mold in a complicated shape, particularly a mold for an optical element, by which the mold can be manufactured in a relatively small time and with a sufficient shape accuracy.

SUMMARY OF THE INVENTION

A manufacturing method for a mold according to the present invention includes the steps of machining a base made of metal into a first shape; coating the base with a resin layer; forming the resin layer into a second shape; and forming the base into a third shape by dry etching.

According to the present invention, formation of the third shape is divided into formation of the first shape and formation of the second shape, and the formation of the first shape is carried out by machining. When the third shape is complicated, a time required for the manufacturing method is remarkably smaller than a time required for a method in which the third shape is formed directly by machining.

Further, since the formation of the first shape is carried out by machining, a high accuracy in a mold shape can be obtained.

In a manufacturing method according to a first embodiment of the present invention, the first shape is a shape that presents one or plural grooves, a shape a cross section of which is uniform, the cross section being perpendicular to a direction on a surface of the base, or a shape that is axially symmetric around an axis perpendicular to a surface of the base.

According to the present embodiment, a time required for the formation of the first shape by machining is remarkably reduced.

In a manufacturing method according to a second embodiment of the present invention, the second shape is a shape that presents one or plural grooves, a shape a cross section of which is uniform, the cross section being perpendicular to a direction on a surface of the base, or a shape that is axially symmetric around an axis perpendicular to a surface of the base.

According to the present embodiment, a time required for the formation of the second shape by machining is remarkably reduced when the second shape is formed by machining.

In a manufacturing method according to a third embodiment of the present invention, the step of forming the resin layer into the second shape is carried out by machining.

In a manufacturing method according to a fourth embodiment of the present invention, the step of forming the resin layer into the second shape is carried out by the lithography technology.

In a manufacturing method according to a fifth embodiment of the present invention, the first shape presents grooves arranged in a first direction on a surface of the base, the second shape presents grooves arranged in a second direction perpendicular to the first direction on a surface of the resin layer and the third shape corresponds to a shape of a microlens array.

According to the present embodiment, a mold for a microlens can be manufactured with a sufficient shape accuracy and in a time that is remarkably shorter than a time required for a case in which the third shape is formed directly by machining.

In a manufacturing method according to a sixth embodiment of the present invention, in the step of forming the base into the third shape by dry etching, the ratio of an etching rate of the base and an etching rate of the resin layer is in a range from 0.1 to 0.9.

In a manufacturing method according to a seventh embodiment of the present invention, when an etching rate of the base is represented by r1, an etching rate of the resin layer is represented by r2, a coordinate along a direction on a surface of the base is represented by $x_1$, a coordinate along the direction perpendicular to the surface of the base formed after dry etching is represented by z where the relationship $z=0$ holds on the surface of the base formed after dry etching, an $x_1 z$ cross section of a target shape of the base corresponding to the first shape is represented by $$z=f_1(x_1),$$

and a coordinate along the direction perpendicular to the surface of the base formed before dry etching is represented by $z_{01}$ where the relationship $z_{01}=0$ holds on the surface of the base formed before dry etching, an $x_1 z_{01}$ cross section of the first shape is determined so as to satisfy the expression $$z_{01} = \frac{r2}{r2-r1} \times f_1(x_1).$$

According to the present embodiment, the first shape is appropriately determined by the etching rates of the base and the resin layer so that the target shape of the base corresponding to the first shape can be obtained.

In a manufacturing method according to an eighth embodiment of the present invention, when an etching rate of the base is represented by r1, an etching rate of the resin layer is represented by r2, a coordinate along a direction on a surface of the base is represented by $x_2$, a coordinate along the direction perpendicular to the surface of the base formed after dry etching is represented by z where the relationship z=0 holds on the surface of the base formed after dry etching, an $x_2z$ cross section of a target shape of the base corresponding to the second shape is represented by $$z=f_2(x_2),$$

and a coordinate along the direction perpendicular to the surface of the base formed before dry etching is represented by $z_{02}$ where the relationship $z_{02}=0$ holds on the surface of the base formed before dry etching, an $x_2z_{02}$ cross section of the second shape is determined so as to satisfy the expression $$z_{02} = \frac{r2}{r1} \times f_2(x_2).$$

According to the present embodiment, the second shape is appropriately determined by the etching rates of the base and the resin layer so that the target shape of the base corresponding to the second shape can be obtained.

In a manufacturing method according to a ninth embodiment of the present invention, the third shape is formed by making a shape resulting from the first shape and a shape resulting from the second shape overlap each other.

In a manufacturing method according to a tenth embodiment of the present invention, the third shape is formed by combining a shape resulting from the first shape and a shape resulting from the second shape without making the shape resulting from the first shape and the shape resulting from the second shape overlap each other.

DESCRIPTION OF EMBODIMENTS

Figure 1:
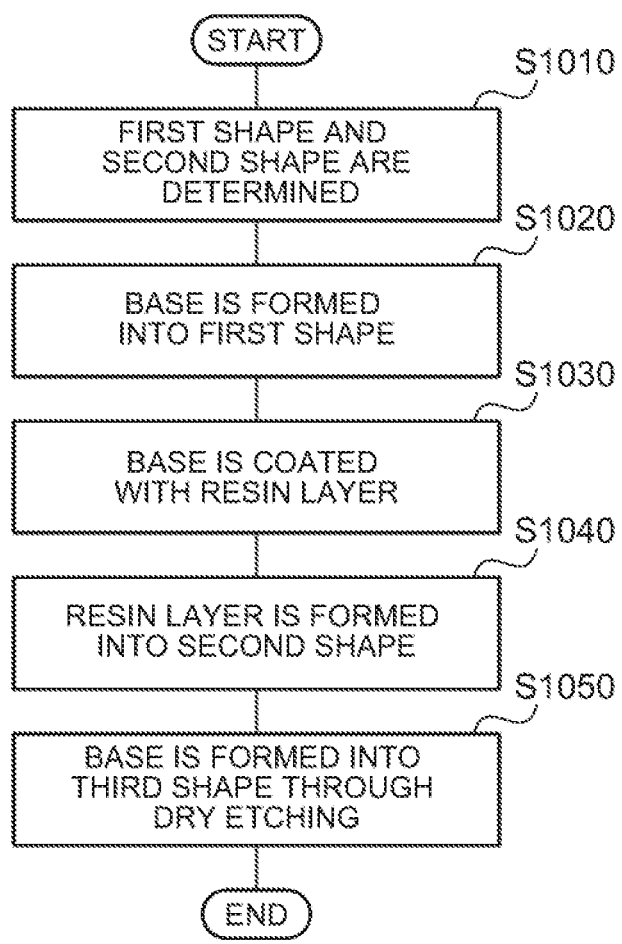
FIG. 1 is a flowchart showing a mold manufacturing method according to an embodiment of the present invention.

FIG. 1 is a flowchart showing a mold manufacturing method according to an embodiment of the present invention.

FIGS. 2A to 2D are drawings for illustrating a mold manufacturing method according to the first embodiment of the present invention.

FIGS. 3A to 3D are drawings for illustrating a mold manufacturing method according to the second embodiment of the present invention. FIGS. 3A to 3D show a cross section containing the central axis of a mold.

In step S1010 of FIG. 1, a shape of a base formed before undergoing dry etching, that is a first shape and a shape of a resin layer formed before undergoing dry etching, that is a second shape are determined. How to determine the first shape and the second shape will be described later.

In step S1020 of FIG. 1, the base made of metal is formed into the first shape by machining.

Figure 4:
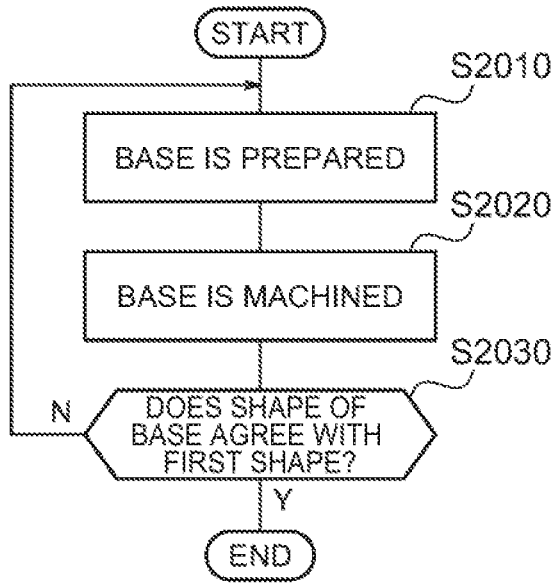
FIG. 4 is a flowchart for illustrating step S1020 of FIG. 1.

FIG. 4 is a flowchart for describing step S1020 of FIG. 1.

In step S2010 of FIG. 4, the base made of metal is prepared.

In step S2020 of FIG. 4, the base made of metal is machined such that the first shape can be obtained.

In step S2030 of FIG. 4, whether the shape of the base agrees with the first shape that is desired or not is determined. If the shape of the base agrees with the first shape that is desired, the process ends. If the shape of the base does not agree with the first shape that is desired, the process returns to step S2010.

Figure 2A:
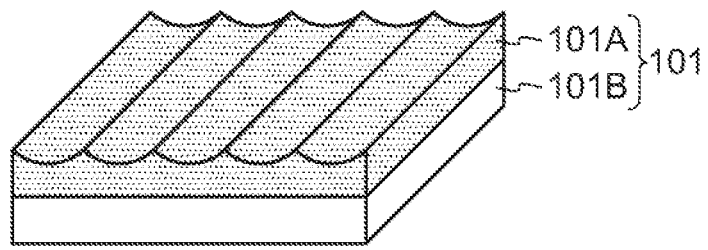
FIGS. 2A to 2D are drawings for illustrating a mold manufacturing method according to the first embodiment of the present invention.

FIG. 2A shows the base that has been machined into the first shape through step S1010 of the mold manufacturing method according to the first embodiment. The base 101 is obtained by forming a nickel-phosphorus film 101A on a steel member 101B. In the present embodiment, the first shape presents grooves having a semi-circular cross section and arranged in a predetermined direction.

Figure 3A:
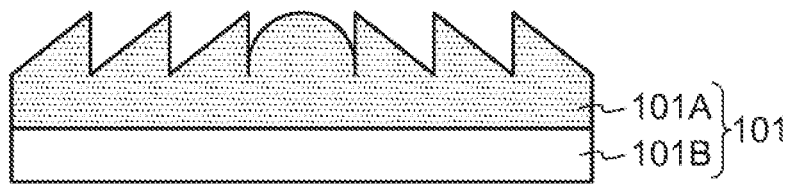
FIGS. 3A to 3D are drawings for illustrating a mold manufacturing method according to the second embodiment of the present invention.

FIG. 3A shows the base that has been machined through step S1010 of the mold manufacturing method according to the second embodiment. The base 101 is obtained by forming a nickel-phosphorus film 101A on a steel member 101B. The first shape presents a diffraction grating pattern and a Fresnel lens pattern that are axially symmetric around the central axis.

In general, if the first shape is a shape of grooves arranged in a predetermined direction, a shape, a cross section of the shape perpendicular to a certain direction on the base surface being uniform, or a shape that is axially symmetric around an axis perpendicular to the base surface, a time required for machining can be remarkable reduced.

In step S1030 of FIG. 1, the base is coated with a resin layer.

Figure 2B:
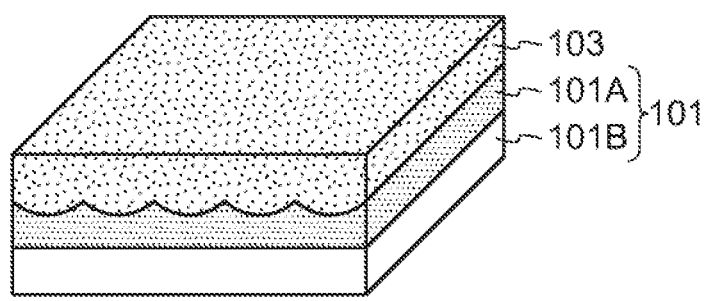

FIG. 2B shows the base that has been coated with the resin layer after completion of step S1030 of the mold manufacturing method according to the first embodiment. The resin layer 103 is present on the base 101 as a coating.

Figure 3B:
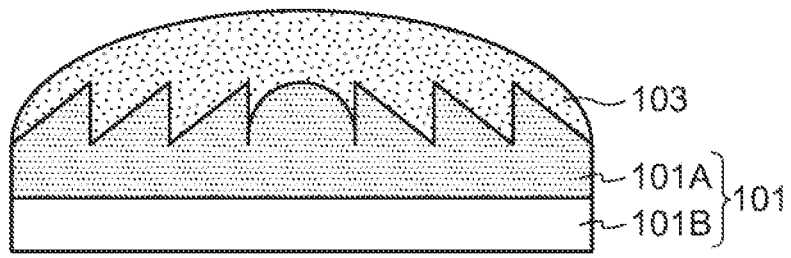

FIG. 3B shows the base that has been coated with the resin layer after completion of step S1030 of the mold manufacturing method according to the second embodiment. The resin layer 103 is present on the base 101 as a coating.

In step S1040 of FIG. 1, the resin layer is formed into a second shape.

Figure 5:
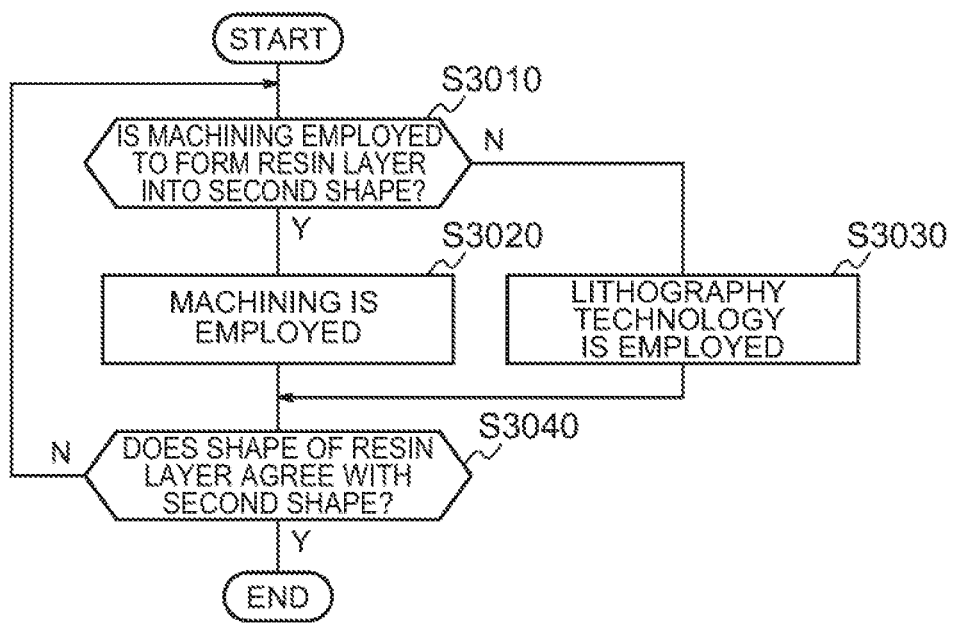
FIG. 5 is a flowchart for describing step S1040 of FIG. 1.

FIG. 5 is a flowchart for describing step S1040 of FIG. 1.

In step S3010 of FIG. 5, it is determined which one of machining and the lithography technology should be employed in order to form the resin layer into a second shape. The lithography technology is not applicable when the resin layer is not photosensitive. When the lithography technology is applicable, features of machining and the lithography technology shown in Table 1 below and the second shape are taken into consideration to determine which one of machining and the lithography technology should be employed.

TABLE 1

|  | Machining | Lithography technology |
|---|---|---|
| Pitch | Several micrometers or greater | 0.1 micrometers or greater |
| Depth | Several micrometers or greater | 50 micrometers or smaller |
| Aspect ratio | — | 4 or smaller |
| Corner R | 1 micrometer or greater | 0.1 micrometers or smaller |
| Formable shape | Any shapes (a planar surface, an aspherical surface, a grating, a free-form surface and the like) | Mainly a binary profile (a binary phase grating and the like, a blazed grating is conditionally formable.) |

In Table 1, "Pitch", "Depth" and "Aspect ratio" mean ranges of the pitch, the depth and the aspect ratio of a periodic structure of surface roughness such as a grating. "Corner R" represents a range of the curvature radius of a corner of a mold. The minimum curvature radius of a corner of a mold formed through machining is greater than the minimum curvature radius of a corner of a mold formed through the lithography technology. A "binary profile" means a shape the height of which has two values, that is, greater one and smaller one.

When it is determined that machining is employed, the process goes to step S3020. When it is determined that the lithography technology is employed, the process goes to step S3030.

In step S3020, machining is employed to form the second shape.

In step S3030, the lithography technology is employed to form the second shape.

In step S3040 of FIG. 5, it is determined whether the shape of the resin layer agrees with the second shape that is desired. If the shape of the resin layer agrees with the second shape that is desired, the process is terminated. If the shape of the resin layer does not agree with the second shape that is desired, the process returns to step S3010.

Figure 2C:
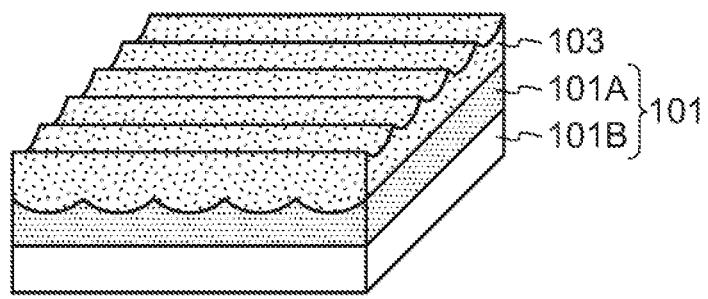

FIG. 2C shows the resin layer that has been formed into the second shape after completion of step S1040 of the mold manufacturing method according to the first embodiment. In the present embodiment, the second shape presents grooves having a semi-circular cross section and arranged perpendicular to the grooves in the base.

Figure 3C:
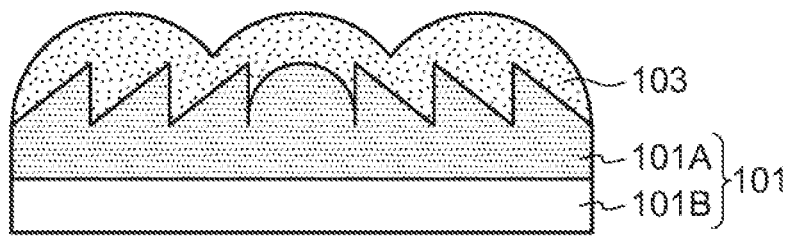

FIG. 3C shows the resin layer that has been formed into the second shape after completion of step S1040 of the mold manufacturing method according to the first embodiment. In the present embodiment, the second shape is sine curve that functions as a diffusing structure.

In step S1050 of FIG. 1, the base is formed into a third shape through dry etching.

How to form the base into the third shape through dry etching will be described below.

Figure 6A:
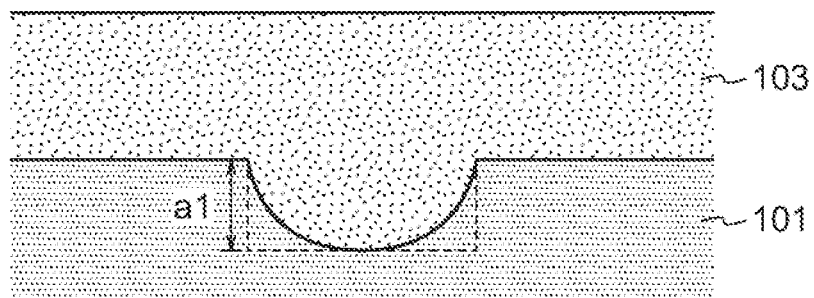
FIG. 6A shows a cross section of a member that is obtained by coating with a resin layer a base having grooves formed on a surface thereof, the cross section being perpendicular to the direction of the grooves.

FIG. 6A shows a cross section of a member that is obtained by coating with a resin layer 103 a base 101 having a groove formed on a surface thereof, the cross section being perpendicular to the direction of the groove. The depth of the groove is represented by a1.

Figure 6B:
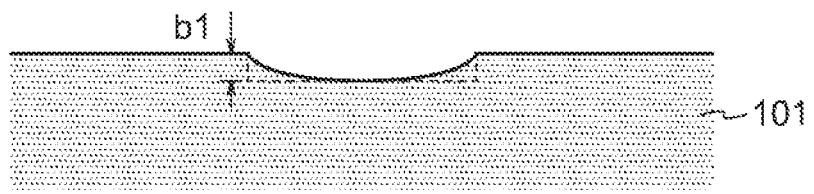
FIG. 6B shows a cross section of a member that is obtained by subjecting the member shown in FIG. 6A to dry etching to remove the resin layer, the cross section being perpendicular to the direction of the grooves of the base.

FIG. 6B shows a cross section of a member that is obtained by subjecting the member shown in FIG. 6A to dry etching to remove the resin layer 103, the cross section being perpendicular to the direction of the groove of the base 101. The depth of the groove is represented by b1.

It is assumed that the cross sections of the grooves in FIG. 6A and FIG. 6B are rectangular as shown by dashed lines. The etching rate of the base 101 is represented by r1, and the etching rate of the resin layer is represented by r2. The relationship of r2>r1 holds.

When the resin layer 103 is etched to the bottom of the groove having the depth of a1 in FIG. 6A, the base 101 around the groove is not etched to the depth of a1. During a period of time after the resin layer 103 has been etched to the bottom of the groove having the depth of a1 and before the base 101 around the groove is etched to the depth of a1, the depth of the bottom of the groove increases by b1. Thus, a groove having the depth of b1 is formed in the base as shown in FIG. 6B after the resin layer 103 has been removed through dry etching.

The depth b1 of the groove in the base 101 shown in FIG. 6B is given by the following expression.

$$b1 = \left(\frac{a1}{r1} - \frac{a1}{r2}\right) \times r1 = \frac{a1 \times (r2 - r1)}{r2}$$

The ratio of the depth b1 and the depth a1 is given by the following expression.

$$\frac{b1}{a1} = \frac{r2 - r1}{r2} \tag{1}$$

Thus, the ratio of the depth b1 and the depth a1 is determined by the etching rate r1 of the base and the etching rate r2 of the resin layer.

Figure 7A:
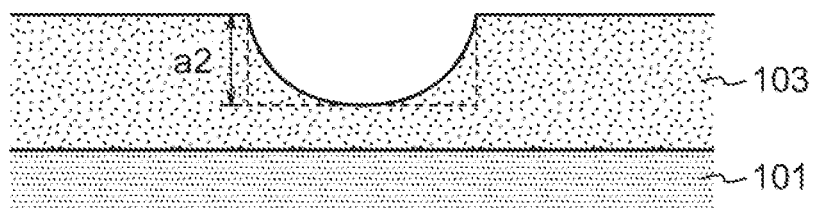
FIG. 7A shows a cross section of a member having a base coated with a resin layer in which a groove is formed, the cross section being perpendicular to the direction of the groove.

FIG. 7A shows a cross section of a member having a base 101 coated with a resin layer 103 in which a groove is formed, the cross section being perpendicular to the direction of the groove. The depth of the groove is represented by a2.

Figure 7B:
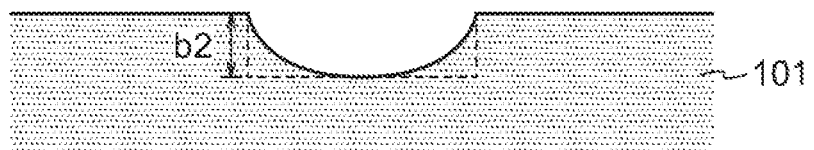
FIG. 7B shows a cross section of a member that is obtained by subjecting the member shown in FIG. 7A to dry etching to remove the resin layer, the cross section being perpendicular to the direction of the grooves of the base.

FIG. 7B shows a cross section of a member obtained by removing the resin layer 103 from the member shown in FIG. 7A through dry etching, the cross section being perpendicular to the direction of the groove in the base 101. The depth of the groove is represented by b2.

It is assumed that the cross sections of the grooves in FIG. 7A and FIG. 7B are rectangular as represented by broken lines. The etching rate of the base 101 is represented by r1, and the etching rate of the resin layer 103 is represented by r2. The relationship r2>r1 holds.

In FIG. 7B, a portion of the base 101 corresponding to the groove of the resin layer 103 is deeper by b2 than a portion corresponding to the portion of the resin layer 103 surrounding the groove of the resin layer 103, because the portion corresponding to the groove of the resin layer 103 is etched longer than the portion corresponding to the portion of the resin layer 103 surrounding the groove of the resin layer 103 by a time period during which the portion of the resin layer 103 surrounding the groove of the resin layer 103 is etched to the depth of a2. In this way, a groove of depth of b2 is formed in the base 101 after the resin layer 103 has been removed by dry etching.

Accordingly, the depth b2 of the groove in the base 101 shown in FIG. 7B is given by the following expression.

$$b2 = \frac{a2}{r2} \times r1 = a2 \times \frac{r1}{r2}$$

The ration of the depth b2 and the depth a2 is given by the following expression.

$$\frac{b2}{a2} = \frac{r1}{r2} \quad (2)$$

Thus, the ratio of the depth b2 and the depth a2 is determined by the etching rate r1 of the base and the etching rate r2 of the resin layer.

In the description given above, it is assumed that the cross sections of the grooves in FIG. 6A and FIG. 7A are rectangular. By way of example, cross sections of the grooves in FIG. 6A and FIG. 7A can be of a circular arc as represented by solid lines in FIG. 6A and FIG. 7A. In this case, the shape of the cross section shown in FIG. 6B is an ellipse having a semimajor axis of a1 and a semiminor axis of b1, and the shape of the cross section shown in FIG. 7B is an ellipse having a semimajor axis of a2 and a semiminor axis of b2.

How to determine a shape of the base 101 to be formed before dry etching and a shape of the resin layer 103 to be formed before dry etching when an etching rate r1 of the base 101 and an etching rate r2 of the resin layer 103 are given will be described below.

Figure 8A:
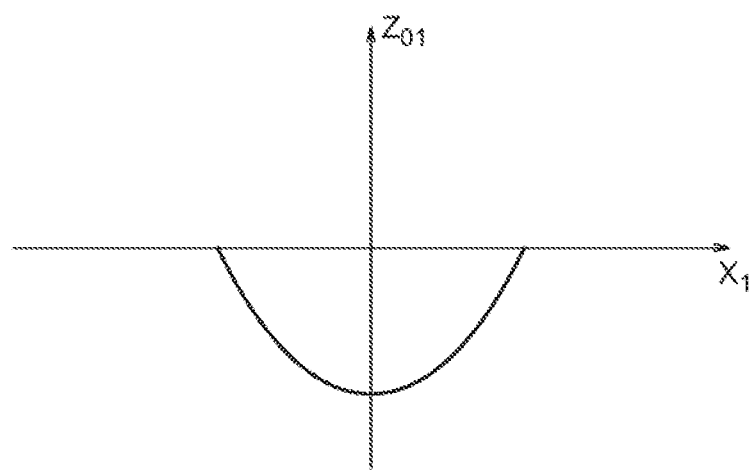
FIG. 8A shows a cross section of a first shape of the base to be formed before dry etching.

FIG. 8A shows a cross section of a first shape of the base 101 to be formed before dry etching.

Figure 8B:
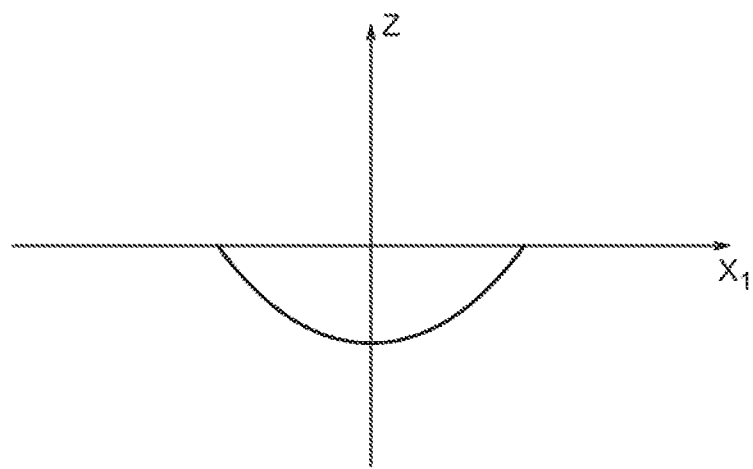
FIG. 8B shows a cross section of a target shape of the base corresponding to the first shape shown in FIG. 8A.

FIG. 8B shows a cross section of a target shape of the base 101 corresponding to the first shape shown in FIG. 8A.

As shown in FIG. 8B, a coordinate along a direction on the surface of the base 101 is represented by $x_1$, and a coordinate along the direction perpendicular to the surface of the base 101 formed after dry etching is represented by z where the relationship z=0 holds on the surface of the base 101 formed after dry etching. An $x_1$ cross section of the target shape of the base 101 corresponding to the first shape is represented by the following expression.

$$z = f_1(x_1)$$

As shown in FIG. 8A, a coordinate along the above-described direction on the surface of the base 101 is represented by $x_1$, and a coordinate along the direction perpendicular to the surface of the base 101 formed before dry etching is represented by $z_{01}$ where the relationship $z_{01}=0$ holds on the surface of the base 101 formed before dry etching. When an $x_1 z_{01}$ cross section of the first shape is determined so as to satisfy the expression $$z_{01} = \frac{r2}{r2-r1} \times f_1(x_1),$$

the target shape of the base 101 shown in FIG. 8B can be obtained according to Expression (1).

Figure 9A:
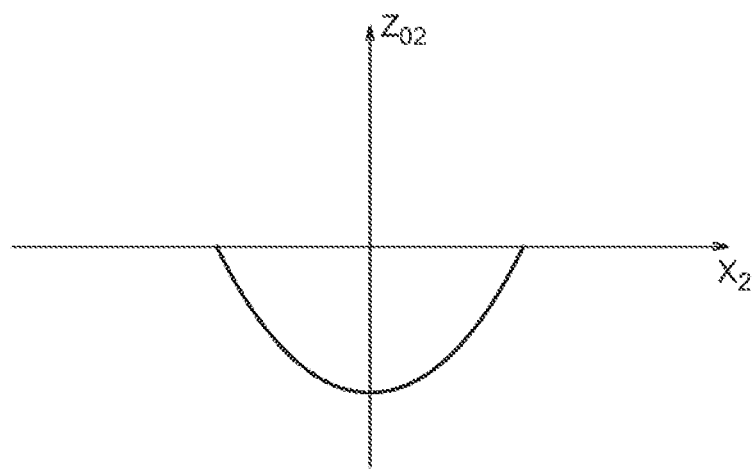
FIG. 9A shows a cross section of a second shape of the resin layer to be formed before dry etching.

FIG. 9A shows a cross section of a second shape of the resin layer 103 to be formed before dry etching.

Figure 9B:
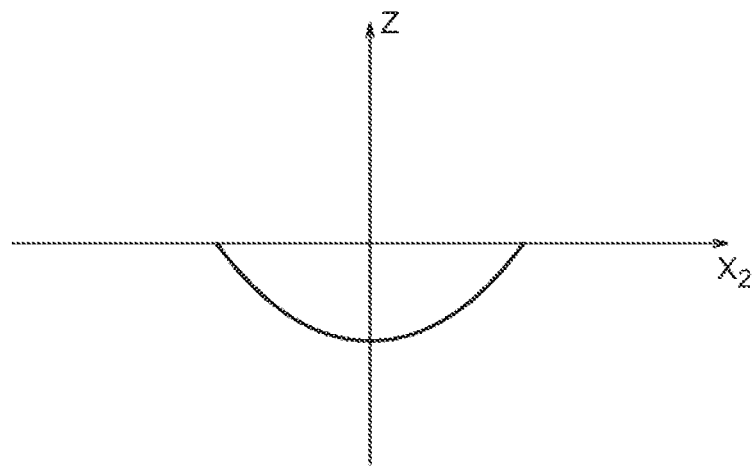
FIG. 9B shows a cross section of a target shape of the resin layer corresponding to the second shape shown in FIG. 9A.

FIG. 9B shows a cross section of a target shape of the resin layer 103 corresponding to the second shape shown in FIG. 9A.

As shown in FIG. 9B, a coordinate along a direction on the surface of the base 101 is represented by $x_2$, and a coordinate along the direction perpendicular to the surface of the base 101 formed after dry etching is represented by z where the relationship z=0 holds on the surface of the base 101 formed after dry etching. An $x_2 z$ cross section of the target shape of the base 101 corresponding to the second shape is represented by the following expression.

$$z = f_2(x_2)$$

As shown in FIG. 9A, a coordinate along the above-described direction on the surface of the base 101 is represented by $x_2$, and a coordinate along the direction perpendicular to the surface of the base 101 formed before dry etching is represented by $z_{02}$ where the relationship $z_{02}=0$ holds on the surface of the base 101 formed before dry etching. When an $x_2 z_{02}$ cross section of the second shape is determined so as to satisfy the expression $$z_{02} = \frac{r2}{r1} \times f_2(x_2),$$

the target shape of the base 101 shown in FIG. 9B can be obtained according to Expression (2).

Figure 2D:
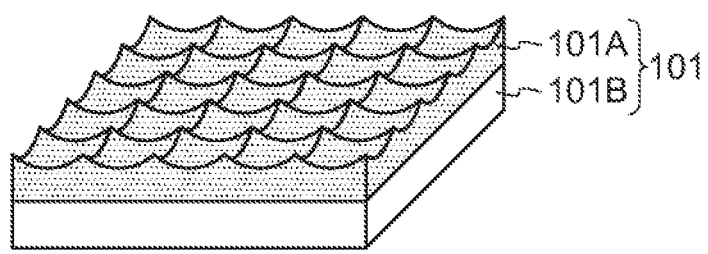

FIG. 2D shows the base made of metal, the base having been shaped into a third shape after completion of the step S1050 of the mold manufacturing method according to the first embodiment. The third shape corresponding to a shape of a microlens can be obtained by subjecting the member shown in FIG. 2C to dry etching, the base of the member having the first shape that is the shape of plural groves in the base and the resin layer of the member having the second shape that is the shape of plural grooves in the resin layer perpendicular to the plural groves in the base. A desired shape of a mold for a microlens can be obtained by appropriately determining the first shape that is the shape of the groves in the base 101 formed before dry etching and the second shape that is the shape of the groves in the resin layer 103 formed before dry etching for the etching rate r1 of the base 101 and the etching rate r2 of the resin layer and then making a shape resulting from the first shape and a shape resulting from the second shape overlap each other through dry etching.

Figure 3D:
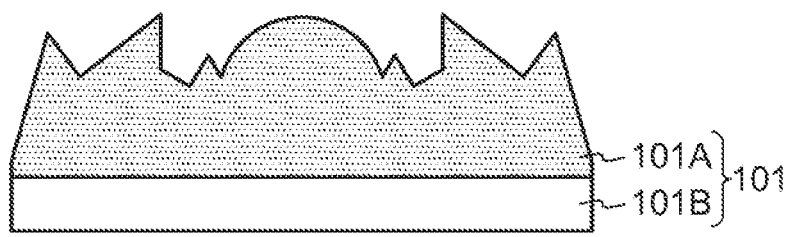

FIG. 3D shows the base made of metal, the base having been shaped into a third shape after completion of the step S1050 of the mold manufacturing method according to the second embodiment. The third shape is a shape of a mold for a Fresnel lens with diffraction grating for diffusion. A desired shape of a mold for a mold for a Fresnel lens with diffraction grating for diffusion can be obtained by appropriately determining the first shape that is the shape of the groves in the base 101 formed before dry etching and the second shape that is the shape of the groves in the resin layer 103 formed before dry etching for the etching rate r1 of the base 101 and the etching rate r2 of the resin layer and then making a shape resulting from the first shape and a shape resulting from the second shape overlap each other through dry etching.

Other embodiments will be described below.

Figure 10A:
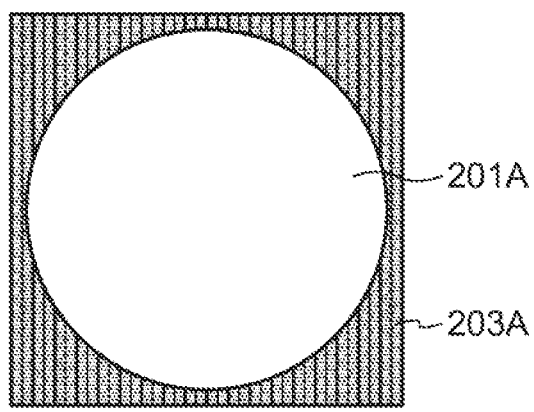
FIG. 10A shows a plan view of an optical element including a lens surrounded by a diffraction grating.

FIG. 10A shows a plan view of an optical element including a lens surrounded by a diffraction grating.

Figure 10B:
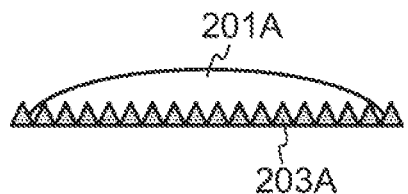
FIG. 10B shows a side view of the optical element including a lens surrounded by a diffraction grating.

FIG. 10B shows a side view of the optical element including a lens surrounded by a diffraction grating.

A lens 201A shown in FIG. 10A and FIG. 10B is formed by the first shape in the step S1010 in FIG. 1. A diffraction grating 203A shown in FIG. 10A and FIG. 10B is formed by the second shape in the step S1040 in FIG. 1. In the present embodiment, a shape resulting from the first shape and a shape resulting from the second shape are combined without being overlapped. The diffraction grating 203A gives a shielding function to the area surrounding the lens 201A.

Figure 10C:
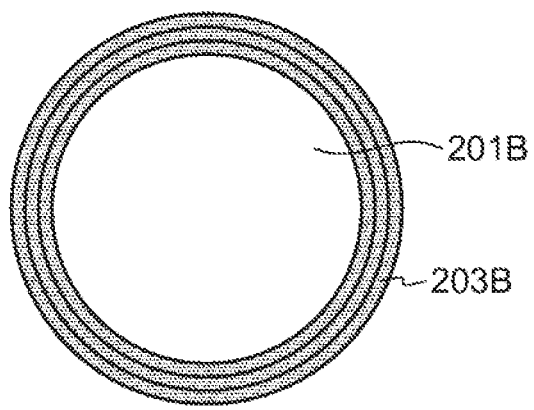
FIG. 10C shows a plan view of an optical element including a lens surrounded by a diffraction grating.

FIG. 10C shows a plan view of an optical element including a lens surrounded by a diffraction grating.

Figure 10D:
FIG. 10D shows a sectional side view of the optical element including a lens surrounded by a diffraction grating.

FIG. 10D shows a sectional side view of the optical element including a lens surrounded by a diffraction grating.

A lens 201B shown in FIG. 10C and FIG. 10D is formed by the first shape in the step S1010 in FIG. 1. A diffraction grating 203B shown in FIG. 10C and FIG. 10D is formed by the second shape in the step S1040 in FIG. 1. In the present embodiment, a shape resulting from the first shape and a shape resulting from the second shape are combined without being overlapped. The diffraction grating 203B gives a shading function through interference effects to the area surrounding the lens 201B.

According to the present invention, a mold of a desired shape can be manufactured in a relatively short time and with a sufficient accuracy by a combination or an overlapping of plural shapes.

Experimental results of the manufacturing method shown in FIG. 1 and FIGS. 2A-2D will be described below.

Table 2 shows the manufacturing conditions.

TABLE 2

| Material | Base NiP | Resin layer OEBR1000 |
| --- | --- | --- |
| Groove depth [mm] | 0.005 | 0.005 |
| Arc of circle of cross section of groove [mm] | R0.05 | R0.05 |
| Etching selectivity | 0.85 | 1 |

The material of the base is a nickel phosphorous film formed on a steel member. The thickness of the film is 100-200 micrometers. The resin layer is made of polymethyl methacrylate PMMA (OEBR1000 of TOK). The thickness of the resin layer is 12 micrometers.

A cross section of a groove formed on a surface of the base and on a surface of the resin layer, the cross section being perpendicular to the longitudinal direction of the groove, is of an arc of circle, the radius of the circle being 50 micrometers. The groove depth is 5 micrometers. The groove width is approximately 44 micrometers.

Ion beam etching was employed as dry etching in step S1050 of FIG. 1. In another embodiment, reactive ion etching can be employed. When the etching rate of the resin layer is represented as 1, the etching rate of the base is represented as 0.85.

Figure 11:
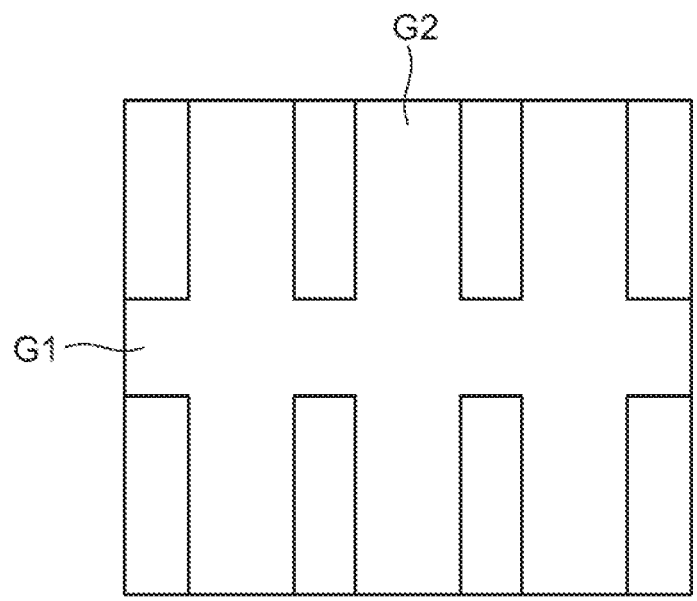
FIG. 11 shows a layout of linear grooves on the base and on the resin layer.

FIG. 11 shows a layout of linear grooves in the base and in the resin layer. The linear grooves G1 in the base and the linear grooves G2 in the resin layer are arranged such that any one of the linear grooves G1 and any one of the linear grooves G2 are perpendicular to each other.

Figure 12:
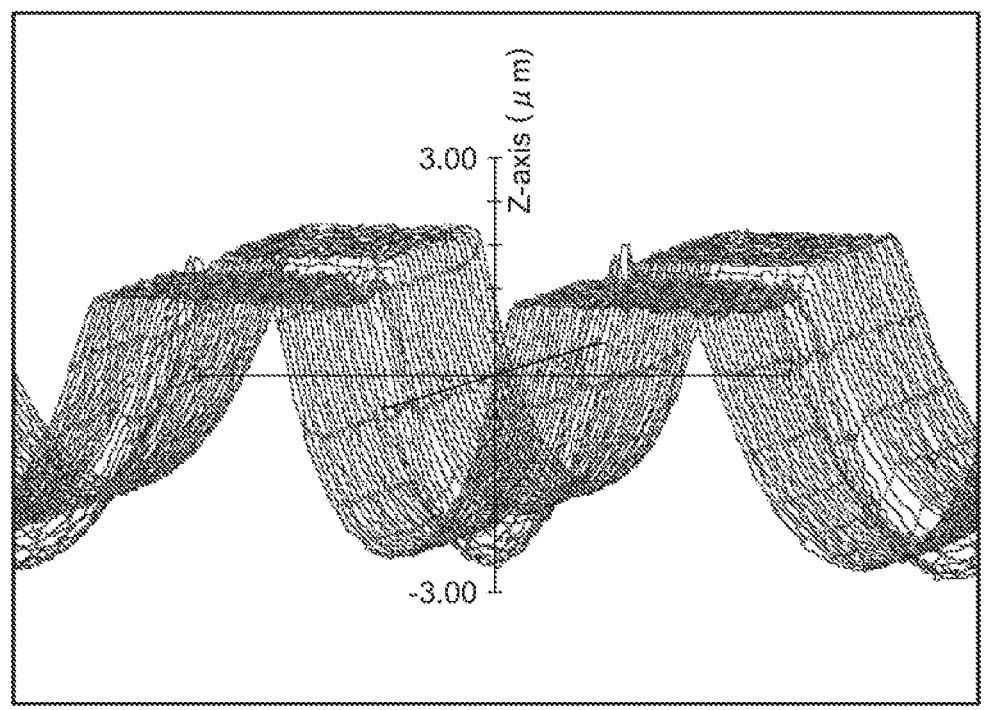
FIG. 12 shows a shape of the base obtained through a measurement after completion of step S1040 in FIG. 1.

FIG. 12 shows a shape of the base obtained through a measurement after completion of step S1050 in FIG. 1. The depth b1 of a groove corresponding to a groove G1 is approximately 0.76 micrometers, and the depth a1 of the groove G1 is 5 micrometers. On the other hand, from Table 2, r1 is 0.85 when r2 is 1. Accordingly, as the value of b1/a1, 0.15 can be obtained using Expression (1), and as the value of b1, 0.75 micrometers can be obtained. Thus, Expression (1) proved to be substantially satisfied. Further, the depth b2 of a groove corresponding to a groove G2 is approximately 4.2 micrometers, and the depth a2 of the groove G2 is 5 micrometers. On the other hand, from Table 2, r1 is 0.85 when r2 is 1. Accordingly, as the value of b2/a2, 0.85 can be obtained using Expression (2), and as the value of b2, 4.25 micrometers can be obtained. Thus, Expression (2) proved to be substantially satisfied.

What is claimed is:

1. A mold manufacturing method comprising the steps of:
   machining a base into a first shape;
   coating the base with a resin layer;
   forming the resin layer into a second shape; and
   forming the base into a third shape by a dry etching process,
   wherein the first shape presents grooves arranged in a first direction on a surface of the base, the second shape presents grooves arranged in a second direction perpendicular to the first direction on a surface of the resin layer and the third shape corresponds to a shape of a microlens array.

2. The mold manufacturing method according to claim 1, wherein the step of forming the resin layer into the second shape is carried out by machining.

3. The mold manufacturing method according to claim 1, wherein the step of forming the resin layer into the second shape is carried out by a lithography technology.

4. The mold manufacturing method according to claim 1, wherein in the step of forming the base into the third shape by the dry etching process, the ratio of an etching rate of the base and an etching rate of the resin layer is in a range from 0.1 to 0.9.

5. A method for manufacturing a microlens array using a mold manufactured by the mold manufacturing method according to claim 1.

6. A mold manufacturing method comprising the steps of:
   machining a base into a first shape;
   coating the base with a resin layer;

forming the resin layer into a second shape; and
forming the base into a third shape by a dry etching process,
wherein when an etching rate of the base is represented by r1, an etching rate of the resin layer is represented by r2, a coordinate along a direction on a surface of the base is represented by $x_1$, a coordinate along the direction perpendicular to the surface of the base formed after the dry etching process is represented by z where the relationship z=0 holds on the surface of the base formed after the dry etching process, an $x_1 z$ cross section of a target shape of the base corresponding to the first shape is represented by $z=f_1(x_1)$, and a coordinate along the direction perpendicular to the surface of the base formed before the dry etching process is represented by $z_{01}$ where the relationship $z_{01}=0$ holds on the surface of the base formed before the dry etching process, an $x_1 z_{01}$ cross section of the first shape is determined so as to satisfy the expression $$z_{01} = \frac{r2}{r2 - r1} \times f_1(x_1).$$

7. A mold manufacturing method comprising the steps of:
machining a base into a first shape;
coating the base with a resin layer;
forming the resin layer into a second shape; and
forming the base into a third shape by a dry etching process,
wherein when an etching rate of the base is represented by r1, an etching rate of the resin layer is represented by r2, a coordinate along a direction on a surface of the base is represented by $x_2$, a coordinate along the direction perpendicular to the surface of the base formed after the dry etching process is represented by z where the relationship z=0 holds on the surface of the base formed after the dry etching process, an $x_2 z$ cross section of a target shape of the base corresponding to the second shape is represented by $z=f_2(x_2)$, and a coordinate along the direction perpendicular to the surface of the base formed before the dry etching process is represented by $z_{02}$ where the relationship $z_{02}=0$ holds on the surface of the base formed before the dry etching process, an $x_2 z_{02}$ cross section of the second shape is determined so as to satisfy the expression $$z_{02} = \frac{r2}{r1} \times f_2(x_2).$$

* * * * *